C. A. PARKER.
Automatic Feeding Apparatus for Stables.
No. 211,773. Patented Jan. 28, 1879.
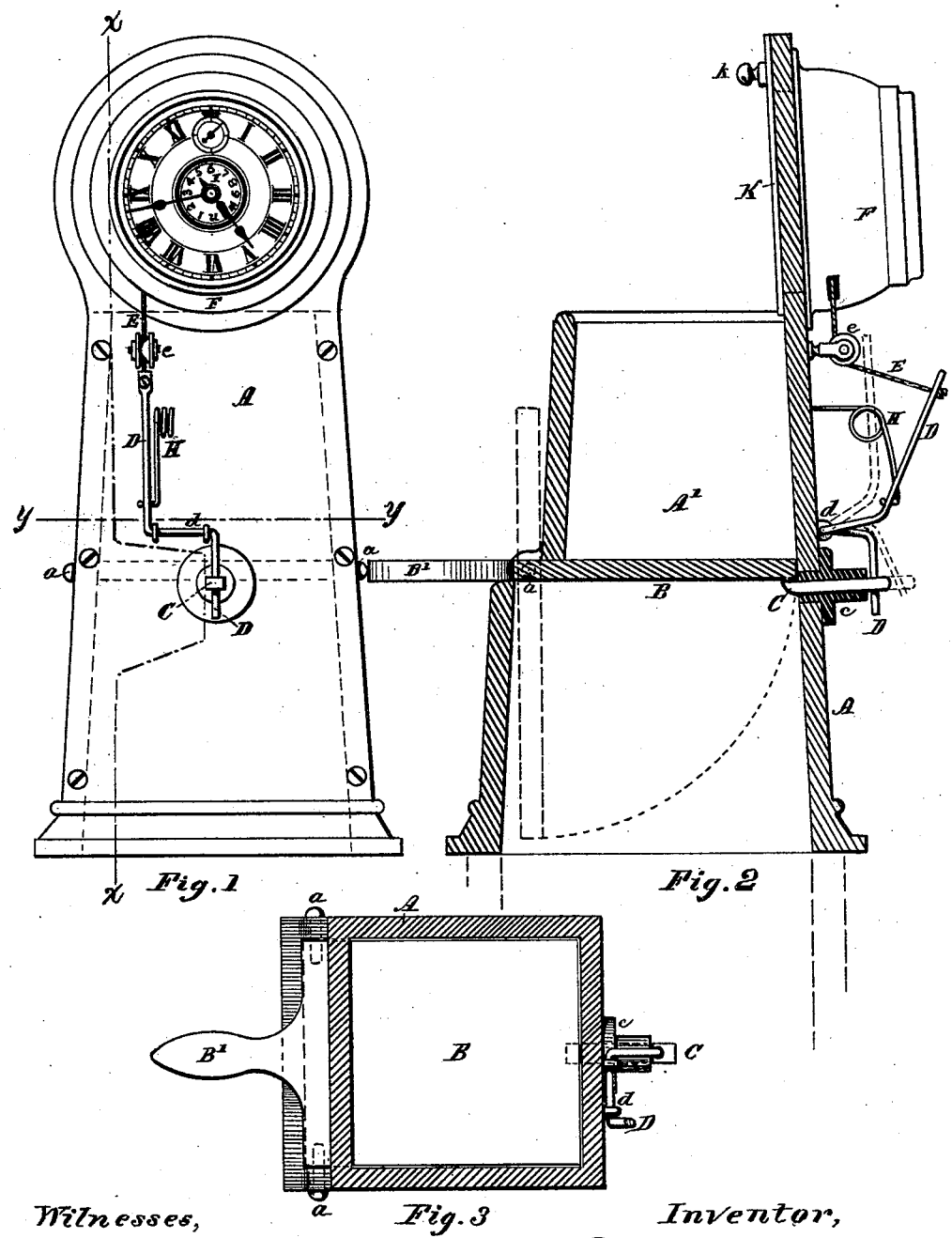
Witnesses,
Charles D. Gay.
S. R. Barton
Inventor,
Charles A. Parker
By Chas. H. Burleigh
Atty.

UNITED STATES PATENT OFFICE.

CHARLES A. PARKER, OF WORCESTER, MASSACHUSETTS.

IMPROVEMENT IN AUTOMATIC FEEDING APPARATUS FOR STABLES.

Specification forming part of Letters Patent No. 211,773, dated January 28, 1879; application filed November 21, 1878.

*To all whom it may concern:*

Be it known that I, CHARLES A. PARKER, of Worcester, in the county of Worcester and State of Massachusetts, have invented certain new and useful Improvements in Automatic Feeding Apparatus for Stables; and I declare the following to be a description of my said invention sufficiently full, clear, and exact to enable others skilled in the art to which it appertains to make and use the same, reference being had to the accompanying drawings, which form a part of this specification, and in which—

Figure 1 represents a front view of my improved automatic feeding apparatus. Fig. 2 is a vertical sectional view on line $x\ x$, Fig. 1; and Fig. 3 is a horizontal section on line $y\ y$, Fig. 1.

The object of my invention is to provide a convenient and serviceable apparatus for feeding horses at any given time without the necessity of the attendant being present at such time.

My invention consists in the combination, with the feeding trough or chute, of a receptacle or trap for retaining the food or grain, a time-indicator and clock mechanism, and devices for springing the trap or discharging the food into the trough at the indicated time, said parts being constructed and organized for operation substantially as hereinafter described.

In the drawings, A denotes a box or receptacle, of suitable size to contain the required quantity of food. Said box is arranged at some convenient position for communication with the feed-trough, or in such relation thereto that the food will drop by gravity into the trough. Box A may, if desired, be a portion of the chute leading from an upper floor of the stable to the feed-troughs in the stalls below.

A swinging trap or plate, B, is arranged within the box A, for closing the passage therein and forming a receptacle, A′, for the food. Said plate B is hinged to the side of the box A, as at $a$, and extends through a slot or opening to the exterior, where it is provided with a handle, B′, for facilitating the convenient adjustment of the parts. The sides of the box A may be somewhat inclined, so that the plate B will readily close the passage and still have sufficient free space around its edges as it swings downward to prevent any liability of becoming clogged. At the side opposite the hinge $a$ the trap B is supported, when in horizontal position, by a movable latch or bolt, C, extending through the side of the box, (or a suitable bushing, $c$, arranged therein,) and connected with the actuating-lever D, which, in turn, is connected by the cord or chain E with the clock mechanism F, arranged at a convenient location exterior to the box A.

The clock mechanism F may be made in the manner of an ordinary alarm-clock, with a winding drum or roll substituted in place of the customary alarm-striking devices, and the end of the cord E attached to said drum, to be wound onto or drawn up by said drum when the alarm is sprung.

The time-indicating disk I is arranged at the center of the clock-dial, as shown. The method of adjusting the alarm to the desired time, and the mechanism and operation of the same being substantially similar to ordinary clocks, and well known, need not be herein particularly described.

In the present instance the clock and alarm are arranged to wind and set from the back, and a slide-cover, K, is arranged in the side of box A to inclose and protect the keys, which cover can readily be drawn up by the knob $k$, to permit access to the keys for adjusting the time devices, when desired. Any other arrangement may be used, if preferred.

The actuating-lever D is fulcrumed at $d$, and has one of its arms connected with the latch-bolt C, while the other arm is joined by cord E with the clock-alarm mechanism. A spring, H, is arranged for pressing outward the upper arm of said lever, as indicated, and a pulley, $e$, serves to guide the cord E onto its winding-drum.

The operation is as follows: A person desiring to use his horse early wishes to have him fed at, say, five o'clock a. m. He accordingly, the evening before, adjusts the alarm-disk I of the clock to indicate the desired time, winds up the springs of the alarm and clock, and sets the trap B upon the bolt C; then prepares the food or grain and places it within the receptacle A′, and retires with the satisfactory thought that he is not required to come out at early morning to give the horse his food. At the proper indicated time the clock F springs the alarm; the cord E is wound in, drawing back the lever D, which in turn withdraws the latch or bolt C, permitting the trap B to drop (see dotted lines, Fig. 2) and discharge the food from the space A' into the feed-trough in front of the horse.

It will be observed that the trap-holding bolt C cannot be moved in to support the trap B until the alarm device has been wound up to release the cord E; hence the attendant cannot place the food in the box and then forget to adjust the discharging mechanism.

Any desired number of boxes or chutes A may be used in a stable, and all be operated at the action of a single clock, by carrying the cords E from the several tripping-bolt devices C D around suitable guide-pulleys and onto the winding drum or drums, so that all of the cords would be centered at one position; or, where many boxes are used, the cord E, or equivalent device, which releases the bolt C of one box can be connected with the handle B' of the trap B of the adjacent box, and the bolt C of the latter be in turn connected with the handle B' of that next in line, and so on through the series, so that the falling of one trap, B, will furnish the force necessary for the unlocking or withdrawal of the bolt C of the adjacent trap, the clock mechanism being employed only for the first in the series.

I am aware that a clock mechanism has heretofore been used in connection with a feeding device; and I do not herein make claim, broadly, to the employment of a clock device for such purpose.

What I claim as of my invention, and desire to secure by Letters Patent, is—

1. The combination, with the feed box or chute A, having a side opening or slot, of the hinged plate B, provided with the handle B', exterior thereto, and a holding-bolt, C, passing through the opposite side of said box, with mechanism for automatically withdrawing the same, for the purpose specified.

2. The combination, with the trap and clock-alarm mechanism in an automatic feeding apparatus, of the lock or bolt withdrawing devices, arranged as shown and described, whereby adjustment of the trap and lock for supporting the feed cannot be effected until after the alarm mechanism has been wound up, as set forth.

CHARLES A. PARKER.

Witnesses:
   CHAS. H. BURLEIGH,
   CHAS. D. GAY.